US 9,773,153 B1

(12) United States Patent
Slottner

(10) Patent No.: US 9,773,153 B1
(45) Date of Patent: Sep. 26, 2017

(54) FINGERPRINT SENSOR MODULE

(71) Applicant: Fingerprint Cards AB, Göteborg (SE)

(72) Inventor: Mats Slottner, Lerum (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/371,527

(22) Filed: Dec. 7, 2016

(30) Foreign Application Priority Data

Mar. 24, 2016 (SE) ........................ 1650394

(51) Int. Cl.
*G06K 9/00* (2006.01)
(52) U.S. Cl.
CPC ..... *G06K 9/00053* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 6,325,285 B1 * | 12/2001 | Baratelli | ............... | G06K 7/0021 235/380 |
| 7,278,025 B2 * | 10/2007 | Saito | ............. | G06K 19/07 713/185 |
| 8,490,872 B2 * | 7/2013 | Kim | ............. | G06K 19/0704 235/380 |
| 8,594,730 B2 * | 11/2013 | Bona | ............. | G06K 19/06187 455/550.1 |
| 8,875,996 B2 * | 11/2014 | Mestres | ............ | G06K 19/07354 235/380 |
| 8,918,900 B2 * | 12/2014 | Saito | ............. | G06K 19/0723 713/186 |
| 9,001,040 B2 * | 4/2015 | Dean | ............. | G06F 3/03547 345/161 |
| 9,235,698 B2 * | 1/2016 | Webber | .............. | G06F 21/32 |
| 9,396,593 B2 * | 7/2016 | Suwald | ............. | G06F 21/34 |
| 9,607,189 B2 * | 3/2017 | Gardiner | ............. | G06K 7/10158 |
| 2003/0035570 A1 * | 2/2003 | Benkley, III | ........ | G06K 9/00026 382/124 |
| 2007/0121575 A1 | 5/2007 | Savry et al. | | |
| 2010/0140359 A1 | 6/2010 | Hamm et al. | | |
| 2013/0148309 A1 | 6/2013 | Fidalgo et al. | | |

(Continued)

FOREIGN PATENT DOCUMENTS

WO 2015096807 A1 7/2015

OTHER PUBLICATIONS

Swedish Search Report for Application No. 1650394-8 dated Nov. 23, 2016, 2 pages.

*Primary Examiner* — Randolph I Chu
(74) *Attorney, Agent, or Firm* — RMCK Law Group, PLC

(57) ABSTRACT

It is provided a fingerprint sensor module comprising: a substrate; a fingerprint sensing device mounted on a first side of the substrate; at least one connection pad arranged on the substrate and configured to electrically connect the fingerprint sensor module to an external component; and an electrically conductive layer arranged on a second side of the substrate, opposing the first side, forming a back surface of the fingerprint sensing module, wherein the electrically conductive layer is connected to control circuitry of the fingerprint sensor module for controlling a potential of a finger in contact with the electrically conductive layer. There is also provided a smart card comprising a fingerprint sensor module.

18 Claims, 5 Drawing Sheets

(56) References Cited

U.S. PATENT DOCUMENTS

| | | | |
|---|---|---|---|
| 2015/0015537 A1 | 1/2015 | Riedijk et al. | |
| 2015/0049925 A1* | 2/2015 | Lowe | G06K 19/0718 382/124 |
| 2015/0102829 A1* | 4/2015 | Son | G06K 9/00053 324/692 |
| 2015/0294131 A1* | 10/2015 | Neskovic | G06K 9/00026 382/125 |
| 2016/0026842 A1* | 1/2016 | Withers | G01R 27/2605 324/686 |
| 2016/0104024 A1* | 4/2016 | Slogedal | G06K 9/0002 324/649 |
| 2017/0076130 A1* | 3/2017 | Kravets | G06K 9/0002 |

* cited by examiner

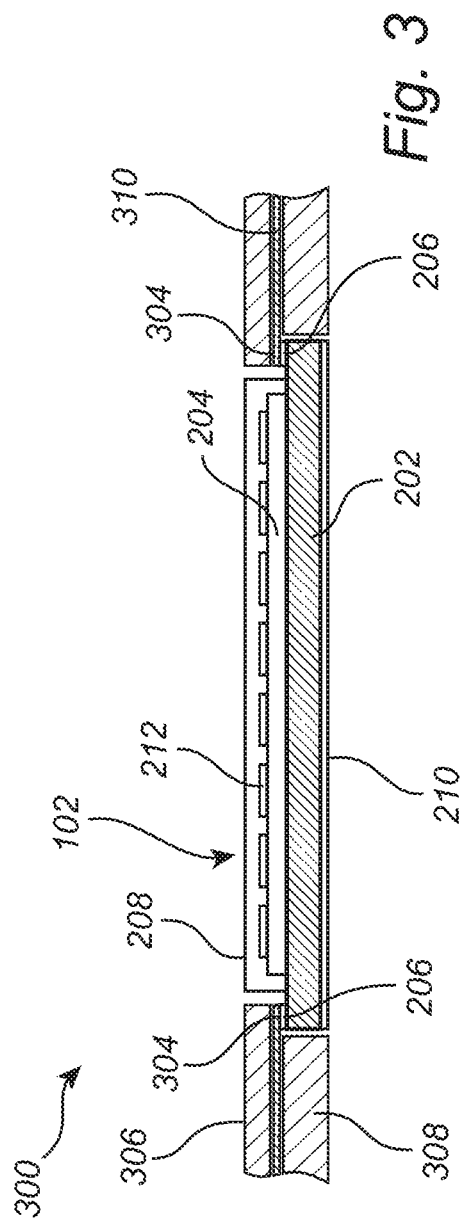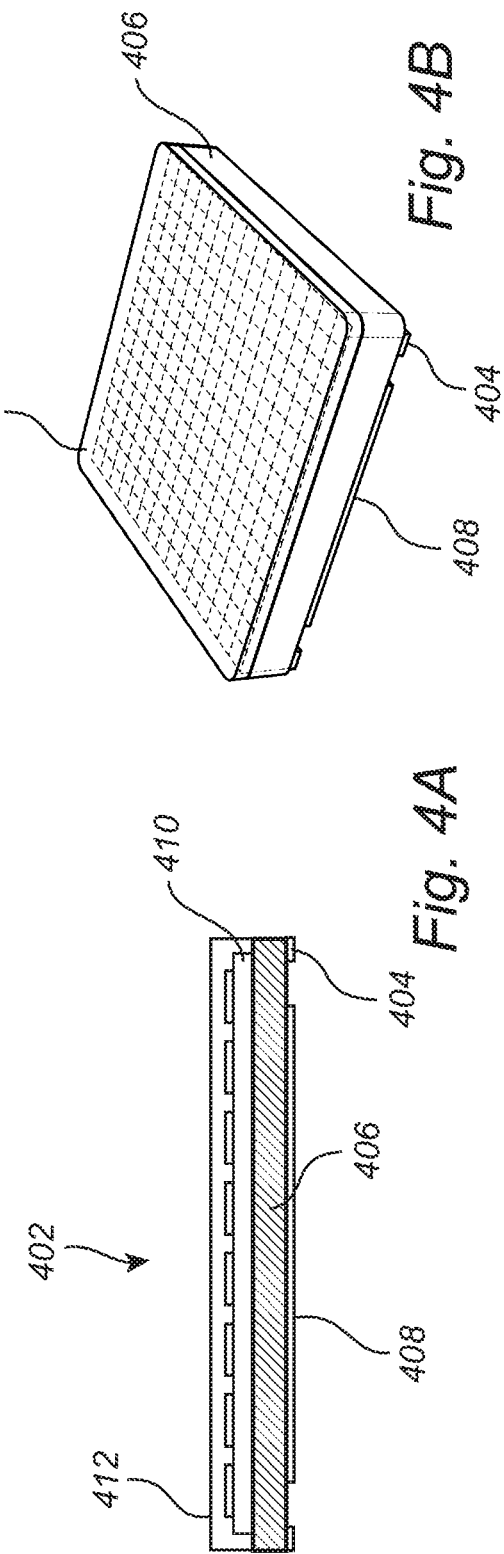

FINGERPRINT SENSOR MODULE

FIELD

The present invention relates to a fingerprint sensing module, and to a smart card comprising such a fingerprint sensing module.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

Among the various available fingerprint sensing principles (such as capacitive, optical, thermal etc.), capacitive sensing is most commonly used, in particular in applications where size and power consumption are important issues. All capacitive fingerprint sensors provide a measure indicative of the capacitance between each of several sensing structures and a finger placed on or moved across the surface of the fingerprint sensor.

To accurately measure the capacitance between the finger and a sensing structure, it is desirable that the finger can be held at a known reference potential. In commonly available used in smartphones and the like, the reference potential can be provided by means of an electrically conductive bezel arranged around the fingerprint sensor, where a finger placed on the sensor also contacts the bezel.

However, for fingerprint sensor integration in smart cards, which is increasingly requested by the market, the requirements of the fingerprint sensor may change compared to when the sensor is used in a smartphone. For example, a bezel involves an individual manufacturing step and also adds steps to the assembly of the fingerprint sensor, thereby adding to the cost of the fingerprint sensor. Since the cost of a smartcard is significantly lower than the cost of smartphone, it is advantageous to also reduce the cost of the fingerprint sensor for a smart card. Furthermore, a rigid metal bezel cannot be incorporated in a flexible smart card.

Accordingly there is a need for an improved fingerprint sensor for integration in a smart card. In particular, there is a need for a fingerprint sensor where a controlled reference potential can be provided to a finger without the use of a bezel.

SUMMARY

In view of above-mentioned and other drawbacks of the prior art, it is an object of the present invention to provide a fingerprint sensing module suitable for integration in a smart card. In particular, the present invention relates to a fingerprint sensing module where a reference potential can be provided to a finger without the use of a bezel, and to a smart card comprising such a fingerprint sensing module.

According to a first aspect of the invention, it is provided a fingerprint sensor module comprising: a substrate; a fingerprint sensing device mounted on a first side of the substrate; at least one connection pad arranged on the substrate and configured to electrically connect the fingerprint sensor module to an external component; and an electrically conductive layer arranged on a second side of the substrate, opposing the first side, forming a back surface of the fingerprint sensing module, wherein the electrically conductive layer is connected to control circuitry of the fingerprint sensor module for controlling a potential of a finger in contact with the electrically conductive layer.

The substrate on which the fingerprint sensing device is mounted may be a conventional PCB substrate, a silicon substrate, or any other type of substrate acting as a carrier for the fingerprint sensing device. For example, the substrate may be a flexible substrate, facilitating integration of the fingerprint sensing module in a smart card, where a certain degree of flexibility may be required.

The fingerprint sensing device can be a capacitive sensing device, where a fingerprint image is captured by determining the capacitive coupling between sensing structures of the sensing device and a finger placed on a sensing surface of the sensing device, where a fingerprint image is acquired by the specific readout circuitry. The readout circuitry may be fully or partially integrated in the same chip as the sensing circuit, or the readout circuitry may comprise circuitry arranged separately from the fingerprint sensing device.

Moreover, the control circuitry is configured to provide a potential reference signal to the conductive layer, to control the potential of a finger in contact with the sensing surface.

The present invention is based on the realization that a fingerprint sensor module suitable for use in a smart card can be provided by arranging an electrically conductive layer on a backside side of a substrate, such that the potential of a finger can be controlled without the use of a bezel. Thereby, when the fingerprint sensing module is gripped with two fingers, e.g. the thumb and the index finger, one finger will be in contact with a sensing surface of the fingerprint sensing device and the other finger will be in contact with the electrically conductive layer. This allows the potential of the finger in contact with the sensing surface to be controlled, which in turn facilitates fingerprint capture. The described fingerprint sensor module can advantageously be integrated in a smart card, as will be discussed in further detail in the following.

Accordingly, a fingerprint sensor module is provided where there is no need for a bezel or a similar conductive structure on the same side as the fingerprint sensor, thereby simplifying the construction of the fingerprint sensor module.

According to one embodiment of the invention the sensor module may further comprise a cover layer arranged on the substrate covering a portion of the substrate to encapsulate at least a portion of the fingerprint sensing device.

In the present context, the cover layer may be an overmold layer arranged to cover and protect the fingerprint sensor. The cover layer may also be a stack of layers comprising additional layers such as a protective plate, and adhesive etc. The cover layer may also be arranged to cover only portions of the fingerprint sensing device, such as the edges of the device comprising bond pads and bond wires, in which case a separate layer or structure may be used to protect sensing structures of the fingerprint sensing device.

According to one embodiment of the invention, the at least one connection pad may be arranged on the first side of the substrate, and wherein the cover layer does not cover the at least one connection pad. The connection pad would thus be arranged on the same side of the substrate as the fingerprint sensing device, facing in the same direction. Moreover, the connection pad is not covered by a cover layer, meaning that the connection pad is exposed to enable a connection to an external component such as a smart card.

According to one embodiment of the invention, the at least one connection pad may be arranged adjacent to an edge of the substrate, thereby facilitating the connection between the sensor module and an external component. It is not always required that the connection pad is arranged directly adjacent to the edge of the substrate. It may in some embodiments be sufficient that the connection pad is arranged on the first side of the substrate somewhere between the fingerprint sensing device and the edge of the substrate. Moreover, it may also be possible to arrange the connection pad on the edge of the substrate, i.e. on the side of the substrate.

According to one embodiment of the invention, a shape of the cover layer is the same as a shape of the substrate, and wherein an area of the cover layer is smaller than an area of the substrate. Moreover, the center of the cover layer may be aligned with a center of the substrate. As an example, the sensor module may comprise a rectangular substrate, having a rectangular fingerprint sensing device with a rectangular cover layer arranged thereon. One or more connection pads may thus be arranged adjacent to the edges of the substrate, where they are exposed and not covered by the cover layer.

According to one embodiment of the invention, the at least one connection pad may be arranged on the second side of the substrate, and galvanically isolated from the conductive layer. The connection pad may thus be located on the same side as the electrically conductive layer, which provides additional integration possibilities of the sensor module.

In one embodiment of the invention, the control circuitry may be configured to provide a drive signal and/or ground potential to the electrically conductive layer. Assuming that the sensor module is gripped with two fingers, where one finger is in contact with the conductive layer and the other finger is in contact with the fingerprint sensing device, the potential of the finger in contact with the sensing device is also controlled by the control circuitry comprised in the sensor module. A further advantage of eliminating the need for a bezel is that the sensor module can be configured to take up a smaller surface area.

According to one embodiment of the invention, the electrically conductive layer may be connected to the control circuitry by means of a via connection through the substrate. In case of a silicon substrate, the connection may be referred to as a through-silicon via (TSV) connection. This allows the control circuitry to be arranged at a distance from the electrically conductive layer. For example, the control circuitry may be separately arranged on the same side as the fingerprint sensing device, or the control circuitry may be integrated in the fingerprint sensing device.

According to one embodiment of the invention, the electrically conductive layer may advantageously be a metal layer, which both provides high conductivity and high resistance to wear and tear. Moreover, the use of a metal allows conventional deposition techniques to be used, such as electroplating, evaporation, sputtering etc.

Moreover, the electrically conductive layer may be patterned, allowing the aesthetic outlook of the electrically conductive layer to be tailored to accommodate different requirements, in turn facilitating integration of the sensor module in a wide range of applications.

According to one embodiment of the invention, the sensor module may further comprise a coating layer arranged on the fingerprint sensing device, and/or on the cover layer. The coating layer could then be the outermost layer of the sensor module, forming a sensing surface. A coating layer may for example be used to give the sensor module a desired color or pattern, or the coating layer could be a hydrophobic and/or oleophobic layer preventing dirt from adhering to the sensor surface.

According to one embodiment of the invention, there is further provided a smart card comprising smart card circuitry and a sensor module according to any one of the above described embodiments, wherein the smart card comprises an opening in which the sensor module is arranged and wherein the fingerprint sensor is electrically connected to the smart card circuitry via a connection point arranged in contact with the connection pad of the sensor module.

As a card is typically gripped with two fingers, this can be utilized to control the potential of the fingers by means of an electrode arranged on the backside of the fingerprint sensor such that when a person grip the card and puts one finger on the sensor, another finger will be in contact with the electrode and the potential of the fingers can thereby be controlled.

The sensor module can thus be used to authenticate a user of a smart card, and information relating to the authentication can be provided to the smart card circuitry by means of the connection pad of the sensor module and a corresponding connection point of the smart card.

According to one embodiment of the invention, the smart card comprises a first layer comprising a first opening having a size and shape corresponding to the cover layer of the sensor module; a second layer comprising a second opening, larger than the first opening and having a size and shape corresponding the substrate of the sensor module; and a conductive layer comprising the connection point, arranged between the first layer and the second layer, wherein the sensor module is arranged such that a connection pad of the sensor module makes contact with the connection point of the smart card. The opening of the first layer may also have a size corresponding to the fingerprint sensing device of the sensing module.

According to one embodiment of the invention, an outer surface of the first layer of the smart card is located in the same plane as a sensing surface of the sensor module; and an outer surface of the first layer of the smart card is located in the same plane as the electrically conductive layer of the sensor module. Thereby, the sensor module can be integrated in plane with a smart card without interrupting the smart card surface profile.

According to one embodiment of the invention, there is provided a smart card comprising smart card circuitry and a sensor module according to any one of the above described embodiments, wherein the smartcard comprises a recess in which the sensor module is arranged such that the fingerprint sensing device is covered by a first layer of said smart card; and wherein the fingerprint sensor module is electrically connected to the smart card circuitry via a connection point arranged in contact with the connection pad of the sensor module.

The sensing module can thereby be hidden as seen from a first side of the smart card, and the fingerprint may be acquired by placing the finger on the surface of the smart card at the appropriate position corresponding to the position of the sensor module, which for example may be visually indicated on the smart card surface. Moreover, by integrating the electrically conductive layer in the backside of the smart card, the sensor module can be fully and seamlessly integrated in the smart card.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 3 schematically illustrate a smart card comprising a sensor module according to an embodiment of the invention;

FIGS. 4A-C schematically illustrate a sensor module according to an embodiment of the invention;

DETAILED DESCRIPTION

In the present detailed description, various embodiments of the fingerprint sensor module according to the present invention are mainly described with reference to a fingerprint sensor module for integration in a smart card, and to a smart card comprising such a sensor module. However, the sensor module may equally well be integrated in components such as USB connectors, electronic keys and key fobs, security tokens and similar components benefiting from biometric verification functionality.

Figure 1:
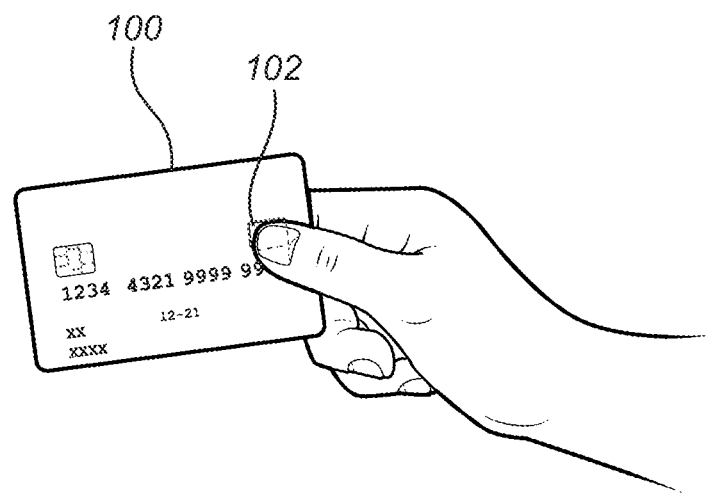
FIG. 1 schematically illustrates a smart card comprising a fingerprint sensor module according to an embodiment of the invention.

FIG. 1 is a schematic illustration of a smart card 100 comprising a sensor module 102 according to an embodiment of the invention.

Figure 2A:
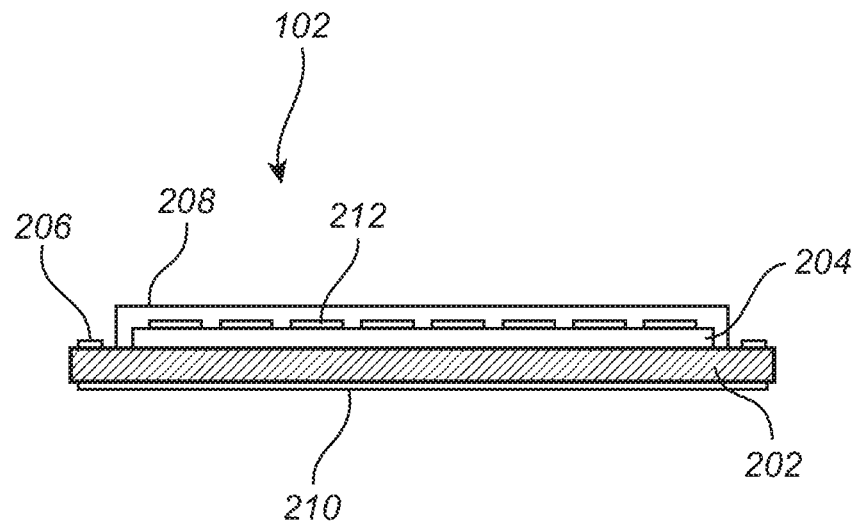
FIGS. 2A-C schematically illustrate a sensor module according to an embodiment of the invention.

FIG. 2A illustrates a fingerprint sensor module 102 comprising a substrate 202 and a fingerprint sensing device 204 mounted on a first side of the substrate 202. A connection pad 206 is arranged on the first side of the substrate, facing in the same direction as the fingerprint sensing device 204. The connection pad 206 is electrically connected to the fingerprint sensing device 204 to provide information of a captured fingerprint to circuitry external to the sensor module 102, such as smart card circuitry. The fingerprint sensing device 204 is encapsulated and protected by a cover layer 208 arranged on the substrate 202. The cover layer 208 may for example be a mold layer, and the cover layer 208 may also comprise a plurality of separate layers. The cover layer 208 here forms an outer surface, i.e. a sensing surface, of the sensor module 102. However, the cover layer 208 may also be arranged to cover only a portion of the fingerprint sensing device 204, such as the area covered by the sensing elements 212, or a separate layer may be arranged to protect only the sensing elements 212 of the fingerprint sensing device 204. A separate layer arranged to protect the sensing elements may for example be a colored coating or a protective dielectric plate such as a cover glass.

The fingerprint sensing device 204 is here illustrated as a capacitive sensing device 204 comprising an array of electrically conductive sensing elements 212, where a difference in capacitive coupling between fingerprint ridges and valleys of a finger placed on the sensor module is utilized to capture a fingerprint.

The fingerprint sensor module 102 further comprises an electrically conductive layer 210 arranged on a second side of the substrate 202, opposing the first side, thereby forming a back surface of the fingerprint sensing module 102. The electrically conductive layer is connected to control circuitry of the fingerprint sensor module 102 for controlling a potential of a finger in contact with the electrically conductive layer 210. The electrically conductive layer 210 can for example be a Cu layer deposited by electroplating. The electrically conductive layer 210 may also be patterned to provide a desired aesthetic appearance, where the patterning may be achieved through laser singulation, lithography, plating etc. For example, the electrically conductive layer 210 may be shaped as a logotype or any other pattern. The fingerprint sensing device may also comprise an electrostatic discharge (ESD) node (not shown) arranged on the same side of the substrate as the fingerprint sensor 204, to protect the sensor from electrostatic discharge.

Figure 2B:
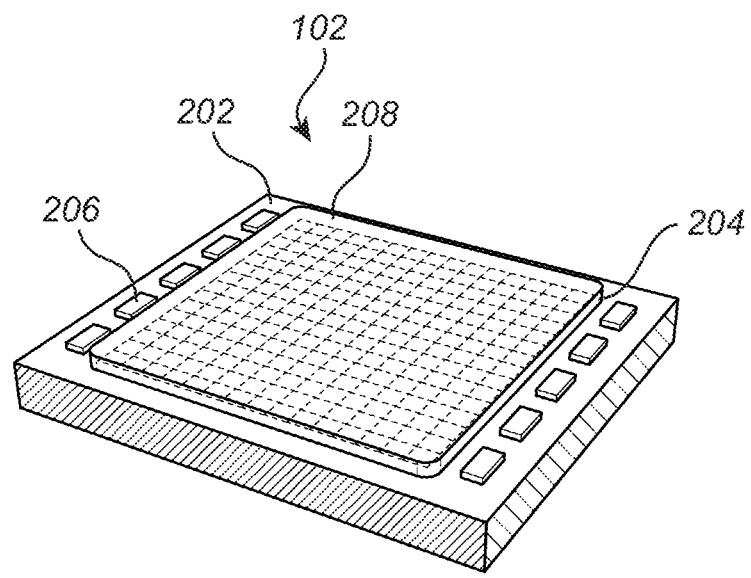

FIG. 2B is a perspective view of the sensor module 102 more clearly illustrating a plurality of connection pads 206 arranged adjacent to edges of the substrate 202. Moreover, the cover layer 208 here has the same shape as the fingerprint sensing device 204 and the substrate 202, but a smaller size than the substrate 202, thereby exposing the connection pads 206 at the edge of the substrate 202. It should be noted that many different configurations of the cover layer and the connection pads are possible. Connection pads 206 may for example be arranged adjacent to all four edges of the substrate 202. The cover layer 208 may also be arranged to reach one or more of the side edges of the substrate. Moreover, even though the substrate 202 is illustrated herein as being a rectangular or square substrate 202, the shape of the substrate may in principle be selected arbitrarily, such as a circular or ellipsoid substrate. The substrate 202 may be a conventional PCB-substrate or it may be a flexible substrate, such as a polyimide substrate.

Figure 2C:
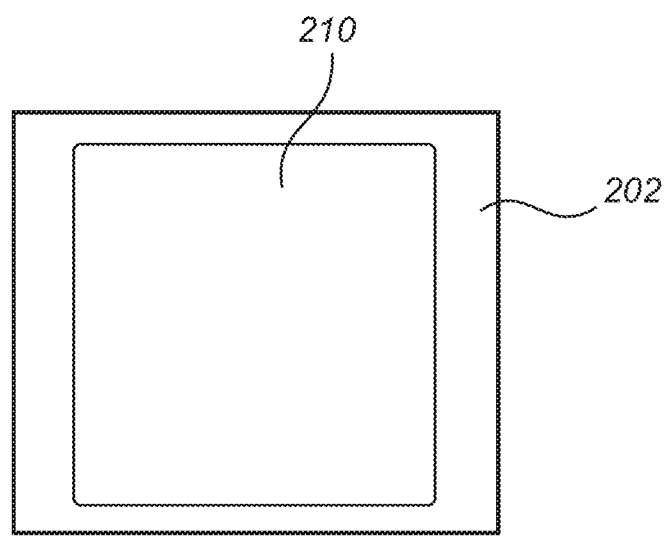

FIG. 2C illustrates the backside of the sensor module 102, comprising the electrically conductive layer 210. The electrically conductive layer 210 may be arranged to cover the entire side of the substrate 202 opposed to the side where the fingerprint sensing device 204 is arranged, or it may cover selected portions of the substrate 202 as illustrated in FIG. 2C, as long as the conductive layer 210 can be assumed to be in galvanic contact with a finger (e.g. the index finger) when the sensor module 102 is gripped and another finger (e.g. the thumb) is placed on the surface of the fingerprint sensing device 204.

Possible configurations of the readout circuitry and the control circuitry for providing a reference potential are well known to the skilled person and will not be discussed in further detail herein. Moreover, both the readout circuitry and the control circuitry may be fully integrated in the fingerprint sensing device 204, or parts of the circuitry may be arranged as discrete components on the substrate 202. The fingerprint sensor module 102 may also be provided as system-in-package (SIP) module where a number of integrated circuits, for example representing the sensing device and parts or all of the readout and control circuitry, are enclosed in a single module. Furthermore, the sensor module may comprise nodes for handling electrostatic discharge, ESD. Dedicated contacts may for example be arranged on the first side of the substrate to connect the finger to ESD circuitry.

FIG. 3 schematically illustrates a smart card 300 comprising the sensor module 102 described above. A smart card should in the present context be interpreted broadly to comprise any card comprising embedded integrated circuits providing functionality. A smart card may for example be a credit card, an access card or an identification card.

The smart card 300 comprises a through-opening in which the fingerprint sensor module 102 is arranged and the sensor module 102 is electrically connected to smart card circuitry (not shown) via a connection point 304 arranged in contact with the connection pad 206 of the sensor module 102. Moreover, the smart card 300 comprises a first layer 306 comprising a first opening having a size and shape corresponding to the cover layer 208 of the sensor module 102 and a second layer 308 comprising a second opening, larger than the first opening and having a size and shape corresponding to the substrate 202 of the sensor module 102. As illustrated here, first and second openings of the respective first and second layers 306, 308 are aligned such that the sensor module 102 can be arranged in the openings. The smartcard 102 further comprises an electrically conductive layer 310 which connects the sensor module 102 to smart card circuitry. The electrically conductive layer 310 may for example comprise a plurality of conductive traces, each comprising a connection point 304 arranged to individually contact a corresponding connection pad 206 of the sensor module 102. An adhesive may be used to attach the sensor module 102 to the smart card 300.

Figure 4C:
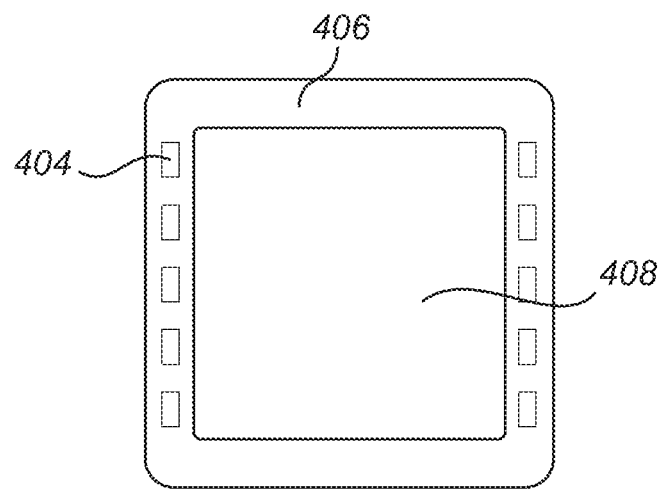

FIGS. 4A-C are schematic illustrations of another embodiment of a fingerprint sensor module 402 with FIG. 4A showing a side view, FIG. 4B showing a perspective view and FIG. 4C showing the backside of the sensor module 402. Here, the connection pads 404 are arranged on the same side of the substrate 406 as the electrically conductive layer 408, i.e. on the backside of the sensor module 402. The sensor module 402 further comprises a fingerprint sensing device 410 and a cover layer 412 covering the fingerprint sensing device 410, to form a sensing surface of the sensor module 402. Accordingly, the described fingerprint sensor module 402 provides additional possibilities for integration in smart card or in other components.

Figure 5A:
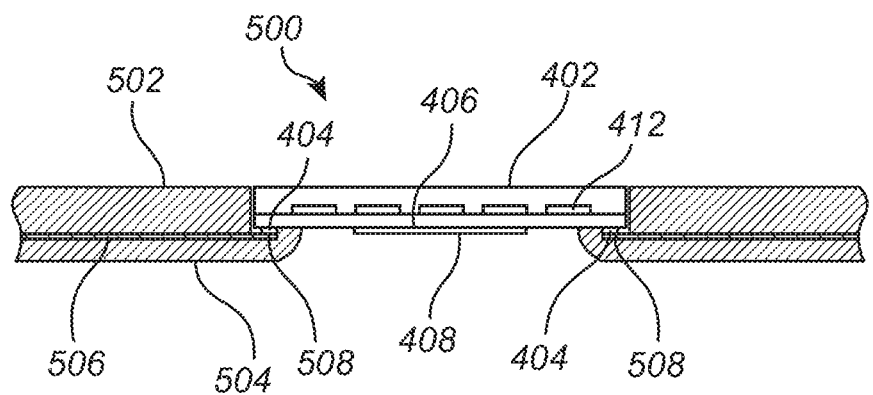
FIGS. 5A-B schematically illustrate smart cards comprising a sensor modules according to embodiments of the invention.

FIG. 5A schematically illustrates a smart card 500 comprising the above described sensor module 402. The smart card comprises a first layer 502 and a second layer 504, and a conductive layer 506 therebetween which may comprise a plurality of conductive traces. In the smart card in FIG. 5A, an opening in the first layer 502 is larger than a corresponding aligned opening in the second layer 504 such that the connection pads 404 of the sensor module 402 contacts connection points 508 of the smart card 500 when the sensor module 402 is arranged in the openings. Here, the backside of the sensor module 402 comprising the conductive layer 408 is slightly recessed with respect to the outer surface of the second layer 506 of the smart card 500, while both sides of the sensor module 402 still are accessible from both sides of the smart card 500. A similar arrangement may be suitable when integrating the sensor module in devices which are thicker than the sensor module, where both sides of the sensor module may be recessed, i.e. arranged in a recess such that the surfaces of the sensor module are below corresponding surfaces of the device in which the sensor module is arranged. Thereby, both sides of the sensor module are accessible even if the device is considerably thicker than the sensing module. Alternatively, or in combination, the thickness of the substrate and/or of the fingerprint sensing device of the sensor module may be adapted such that the overall thickness of the sensor module correspond to the thickness of the device in which the sensor module is to be arranged.

Figure 5B:
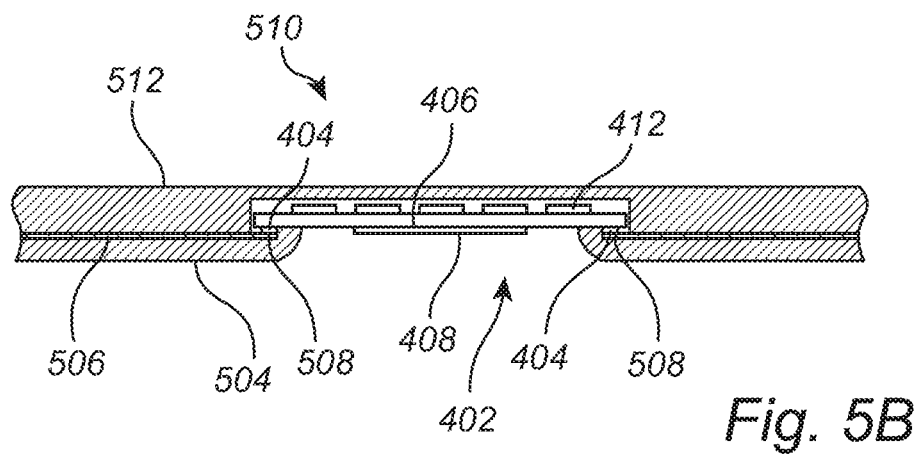

FIG. 5B schematically illustrates a smart card 510 comprising a sensor module 402 covered by a first layer 512 of the smart card such that the sensor module 402 is hidden beneath the surface of the smart card 510. The thickness of the first layer 512 at the location of the fingerprint sensing device 410 can be adapted so that a fingerprint may be acquired through the first layer 512.

The skilled person realizes that many combinations of the above described embodiments are possible relating to on which side of the sensor module the connection pads are located, how the sensor module is integrated in the smart card and so on.

Furthermore, the sensor module may comprise a plurality of connection pads arranged in different locations for enabling connection of the module to different types of components, such as smart cards, USB-tokens, car keys etc. Thereby, a sensor module can be provided which can be used in a range of different applications without the need for application specific modifications of the sensor module.

Figure 6:
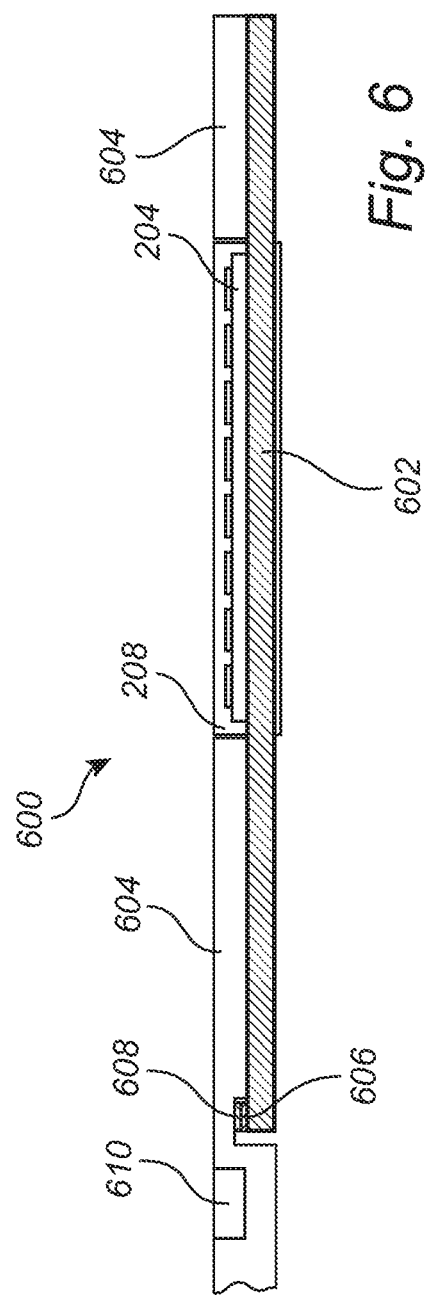
FIG. 6 schematically illustrates a smart card comprising a sensor module according to an embodiment of the invention.

FIG. 6 schematically illustrates a smart card 600 where the substrate 602 forms a larger part of the overall smart card 600. The substrate 602 may for example fully or partially replace the second layer, i.e. the bottom layer, of the smart card 600. As illustrated in FIG. 6, the first layer 604, i.e. the top layer, of the smart card 600 is arranged on top of the substrate 602, and an electrical contact is formed between a connection pad 606 of the substrate 602 and a corresponding connection point 608 of the smart card 600 to connect the sensor module 600 to smart card circuitry 610. Moreover, the first layer may be extended to cover the fingerprint sensing device in a similar manner as described in relation to FIG. 5B, thereby forming smart card with a fully integrated sensor module.

Even though the invention has been described with reference to specific exemplifying embodiments thereof, many different alterations, modifications and the like will become apparent for those skilled in the art. Also, it should be noted that parts of the fingerprint sensor module may be omitted, interchanged or arranged in various ways, the fingerprint sensor module yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A fingerprint sensor module comprising:
   a substrate;
   a fingerprint sensing device mounted on a first side of the substrate;
   at least one connection pad arranged on the substrate and configured to electrically connect the fingerprint sensor module to an external component; and
   an electrically conductive layer arranged on a second side of the substrate, opposing the first side, forming a back surface of the fingerprint sensing module, wherein the electrically conductive layer controls a potential of a finger in contact with the electrically conductive layer using control circuitry of the fingerprint sensor module.

2. The sensor module according to claim 1, further comprising a cover layer arranged on the substrate covering a portion of the substrate to encapsulate at least a portion of the fingerprint sensing device.

3. The sensor module according to claim 2, wherein the at least one connection pad is arranged on the first side of the substrate, and wherein the cover layer does not cover the at least one connection pad.

4. The sensor module according to claim 3, wherein the at least one connection pad is arranged adjacent to an edge of the substrate.

5. The sensor module according to claim 2, wherein a shape of the cover layer is the same as a shape of the substrate, and wherein an area of the cover layer is smaller than an area of the substrate.

6. The sensor module according to claim 2, wherein a center of the cover layer is aligned with a center of the substrate.

7. The sensor module according to claim 1, wherein the at least one connection pad is arranged on the second side of the substrate, and galvanically isolated from the conductive layer.

8. The sensor module according to claim 1, wherein the control circuitry is configured to provide a drive signal or ground potential to the electrically conductive layer.

9. The sensor module according to claim 1, wherein the electrically conductive layer is connected to the control circuitry by means of a via connection through the substrate.

10. The sensor module according to claim 1, wherein the electrically conductive layer is a metal layer.

11. The sensor module according to claim 1, wherein the electrically conductive layer is patterned.

12. The sensor module according to claim 1, further comprising a coating layer arranged on the fingerprint sensing device.

13. The sensor module according to claim 12, wherein the coating layer is colored.

14. The sensor module according to claim 12, wherein the coating layer comprises a pattern.

15. A smart card comprising smart card circuitry and a sensor module according to claim 1, wherein the smart card comprises an opening in which the sensor module is arranged and wherein the fingerprint sensor module is electrically connected to the smart card circuitry via a connection point arranged in contact with the connection pad of the sensor module.

16. The smart card according to claim 15, comprising:
a first layer comprising a first opening having a size and shape corresponding to the cover layer of the sensor module;
a second layer comprising a second opening, larger than the first opening and having a size and shape corresponding the substrate of the sensor module; and
a conductive layer comprising the connection point, arranged between the first layer and the second layer, wherein the sensor module is arranged such that a connection pad of the sensor module makes contact with the connection point of the smart card.

17. The smart card according to claim 16, wherein an outer surface of the first layer of the smart card is in the same plane as a sensing surface of the sensor module; and
an outer surface of the second layer of the smart card is in the same plane as the electrically conductive layer of the sensor module.

18. A smart card comprising smart card circuitry and a sensor module according to claim 1, wherein the smart card comprises a recess in which the sensor module is arranged such that the fingerprint sensing device is covered by a first layer of said smart card; and wherein the fingerprint sensor module is electrically connected to the smart card circuitry via a connection point arranged in contact with the connection pad of the sensor module.

* * * * *